United States Patent [19]

An

[11] Patent Number: 5,173,888

[45] Date of Patent: Dec. 22, 1992

[54] PLAYBACK SYSTEM FOR AUDIO MEMORY DISKS

[75] Inventor: Il-Sung An, Maetan, Rep. of Korea

[73] Assignee: Samsung Electronics Co., Ltd., Suwon, Rep. of Korea

[21] Appl. No.: 516,564

[22] Filed: Apr. 30, 1990

[30] Foreign Application Priority Data

Jun. 5, 1989 [KR] Rep. of Korea .............. 89-7697

[51] Int. Cl.$^5$ ............................................ G11B 17/22
[52] U.S. Cl. ..................................... 369/33; 369/30; 360/51
[58] Field of Search .................. 369/33, 30, 32, 126, 369/276; 365/52, 45; 360/51, 70, 73.03, 73.01

[56] References Cited

U.S. PATENT DOCUMENTS

| | | | |
|---|---|---|---|
| 4,209,850 | 6/1980 | Tazaki | 365/52 |
| 4,318,188 | 3/1982 | Hoffmann | 365/45 |
| 4,445,189 | 4/1984 | Hyatt | 365/45 |
| 4,447,786 | 5/1984 | Saar | 365/45 |
| 4,499,509 | 2/1985 | Gohda | 369/30 |
| 4,796,247 | 1/1989 | Vogelsang | 369/33 |
| 4,813,014 | 3/1989 | DeBell | 365/52 |
| 4,823,207 | 4/1989 | Kobayashi et al. | 360/51 X |
| 4,855,979 | 8/1989 | Kimura | 369/33 |
| 4,872,151 | 10/1989 | Smith | 369/33 |
| 4,893,293 | 1/1990 | Endo | 369/33 |
| 4,905,289 | 2/1990 | Micic | 365/45 |
| 4,918,676 | 4/1990 | Miyasaka | 369/33 |
| 4,922,476 | 5/1990 | Kiyoura | 369/33 |
| 4,998,272 | 3/1991 | Hawkins, Jr. et al. | 379/77 |

FOREIGN PATENT DOCUMENTS

| | | | |
|---|---|---|---|
| 0099984 | 5/1986 | Japan | 369/33 |
| 0149892 | 6/1988 | Japan | 369/33 |

Primary Examiner—Stuart S. Levy
Assistant Examiner—Joseph A. Rhoa
Attorney, Agent, or Firm—Robert E. Bushnell

[57] ABSTRACT

An audio memory playback system has a playback device for playing back data stored in an audio memory, playback speed control for increasing or decreasing an addressing speed of an address generator, a display circuit for displaying the operational state of a key matrix, and an output circuit for providing the data stored in the audio memory. The audio memory playback system may playback a digital melody stored in the audio memory by recognizing an applied signal from the key matrix through the controller and control a playback speed of an audio signal according to a control signal of the controller, and carry out automatic selections.

11 Claims, 2 Drawing Sheets

PLAYBACK SYSTEM FOR AUDIO MEMORY DISKS

BACKGROUND OF THE INVENTION

The present invention relates to playback of an audio signal memory disk (hereinafter termed audio memory disk), and more particularly to an audio memory disk playback system which can improve playback without a loss of digital melody memorized in the audio memory disk.

The conventional sound systems are mostly cassette tape recorders using music cassette tapes and digital audio systems using recording media such as digital audio tapes or compact disks to reduce the distortion of signals. However, in such digital audio systems, the effectiveness of the recording media deteriorates since the amount of additional data is significant, e.g. as parity data bits to check and correct reproduced data in compensation for data drop and merge data bits to merge sampling data, are more than that of real data. Thus, the additional data processing circuits and mechanisms are needed and a total configuration of the audio playback system becomes complicated, often causes trouble.

SUMMARY OF THE INVENTION

It is an object of the present invention to provide an audio memory playback system which improves the accuracy of playback by not using audio tapes and compact disks.

Another object of the present invention is to provide an audio memory disk playback system which has a simple structure and is then easily and widely used in conventional audio systems.

The present invention for these objects comprises a playback system including a controller for controlling the generation of an address and a playback speed according to the input function signal from a key matrix, an address generator connected to the controller for generating each different address according to the output control signal of the controller, and an audio memory connected to the address generator of which memorized digital melody reproduced according to the address generated from the address generator to playback the digital melody memorized in the audio memory disk; playback speed controller means for increasing or decreasing addressing speed of a address generator by determining the dividing ratio under the control of the playback system; a display circuit for displaying the operation state of the key matrix; and an output circuit connected to an output terminal of the audio memory disk for providing digital melody data in audio memory.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

The present invention will be now described in more detail with reference to accompanying drawings.

Figure 1:
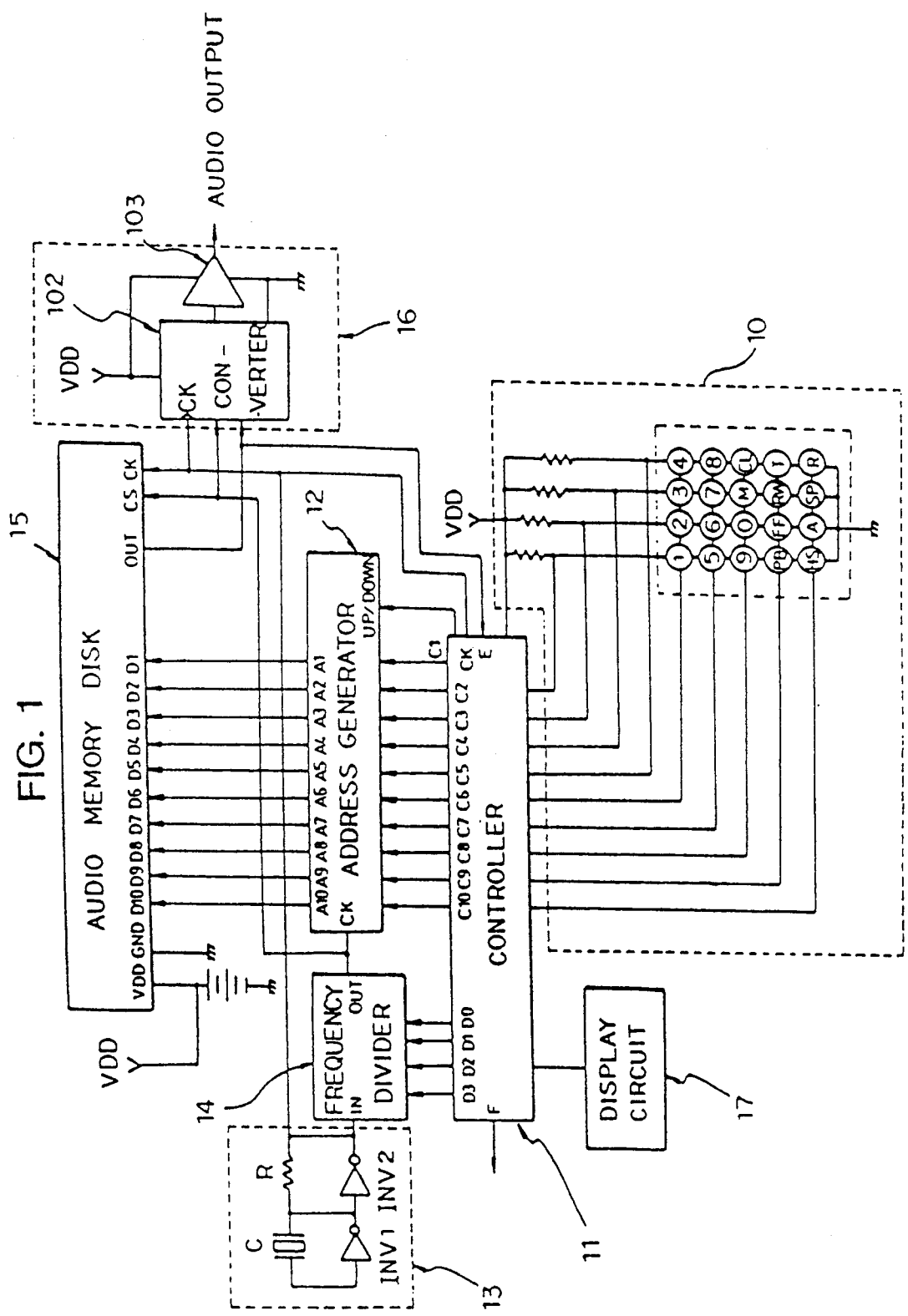
FIG. 1 is a detailed circuit diagram of an audio memory disk playback system according to the present invention.
Figure 2:
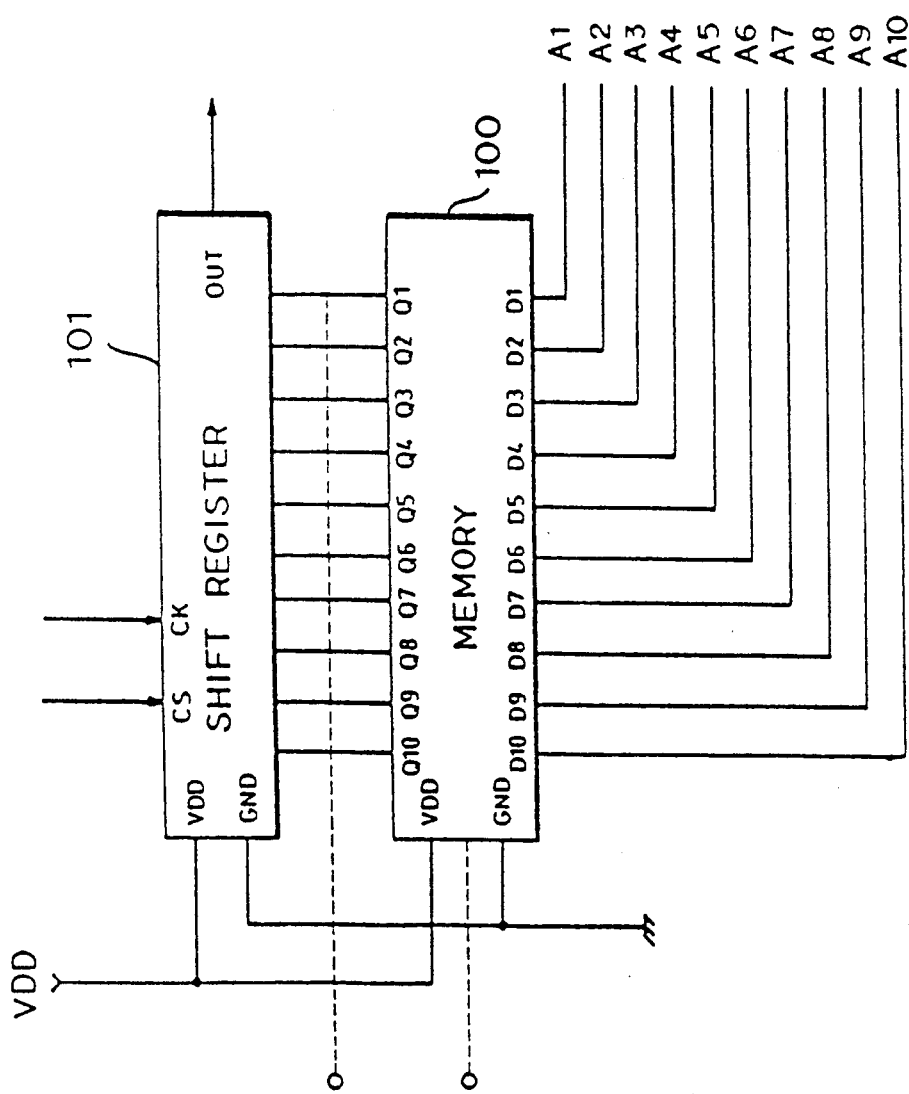
FIG. 2 is an internal block diagram of a conventional audio memory.

FIG. 1 is a detailed circuit diagram representing a playback system for reproducing the digital melody memorized in a audio memory disk. A key matrix is used for selecting various functions of the audio memory, playback system for controlling the audio memory according to an input signal from the key matrix, and speed controller for controlling the reproducing speed and searching speed of the playback system, and display and output circuits for respectively displaying the operational state of the playback system and providing data reproduced by the playback system.

The key matrix 10 has melody number selection keys 0 to 9, a memory key M for storing the sequence of melodies to be selected, a clear key CL, a playback key PB for reproducing the digital melody memorized in the audio memory, a forward key FF, a reverse key RW, a radio selection key R, a selection key T, a stop key SP, an automatic selection key A for selecting automatically the memorized digital melody, and a high speed search key HS. The key matrix 10 is identical with that of the conventional audio systems.

The playback system is connected to the key matrix, with a controller 11 for controlling an address generator 12 according to the selected function at the key matrix 10 by users and a playback speed, an address generator 12 for generating each address according to the control output signal provided from the controller 11, and an audio memory 15 in which the digital melody memorized according to the address number provided from the address generator 12 is reproduced.

That is, the controller 11 for controlling the address generation and the playback speed according to the selected function by the user, is connected to an output terminal of the key matrix 10. Next, the address generator 12 for generating addresses according to a control output signal of the controller 11 and the audio memory in which the memorized digital melody is reproduced according to the address number of the address generator 12 are connected to the controller 11. The audio memory comprises a memory portion 100 for memorizing an audio digital signal and a shift register 101 for serially providing parallel audio signals reproduced from the memory portion 100. In the above memory portion 100, the start and end addresses of each melody and the contents of the memorized digital melodies are already set during the audio memory device manufacturing process.

Further, the speed control is connected to the output terminal of the playback systems. The speed control includes a frequency oscillation circuit 13 for providing a constant frequency signal, and a frequency divider 14 for increasing the control speed by a dividing ratio after determining a dividing ratio. That is, the frequency signal divider 14 is connected to the frequency oscillation circuit 13 which generates constant frequency signal by using a crystal oscillator C, in order to make the address generation and playback speed of the address generator 12 by using a multiple of the reference frequency according to the control signal of the controller 11. Further, the output circuit 16 for providing an analog signal after converting the serial digital output signal of the audio memory 15 to the analog output signal is connected to the audio memory 15. The output circuit 16 includes a digital-to-analog (D/A) converter 102 for a D/A conversion of the digital output signal coming from the audio memory 15, and an amplifier 103 for amplifying the analog output signal of D/A converter 102.

On the other hand, the display circuit 17 for disclosing the input state from the key matrix 10 to the output terminal of the controller 11, is connected to the controller 11. The display circuit 17 has LCD (Liquid Crystal Display) or LED (Light Emitting Diode). The address generator 12 uses a HD14510B chip, which is a typical integrated circuit made by HITACHI, Ltd. in Japan, and the frequency divider 14 uses the TC74H161 integrated circuit.

It is assumed that the audio memory playback system is also used as a radio, and that ten melodies are already memorized in the audio memory 15, and the playback sequence begins from a melody 1.

First, under a normal speed, when a forward direction playback command is applied, a playing process for reproducing the digital melody memorized in the audio memory will be described.

If the key presses the playback key PB of the key matrix 10 so as to be recognized by the controller 11, the controller 11 initializes the address generator 12 connected to the next stage and drives the shift register 101 of the audio memory 15 connected to the next stage of the address generator 12. At this time, the controller 11 controls access to the contents of the melodies memorized in the audio memory 15.

Next, if the user presses the selection key T and the playback key PB of the key matrix 10, a playback is input corresponding to a playback command (that is, one of the forward direction playback of controller 11). At this time, the controller 11 controls display circuit 17 to display the characters representing the playback state, for example, "PLAY". At the same time, the controller 11 applies a high level signal to an up or down count terminal UP/DOWN of the address generator 12. Also, the controller 11 provides control output signals through control terminals D0-D3 to the frequency divider 14 to keep the normal playback speed. At this time, the dividing ratio of the output signal of the frequency divider 14 determined to be 1. For setting the dividing ratio to 1, the controller 11 provides all low level signals through the control terminals D0-D3. Then, the frequency divider 14 provides an output signal to the address generator 12 through an output terminal OUT and also provides a chip selection signal CS to the audio memory 15. At the same time, the address generator 12 provides address signals A1-A10 for the melody 1, which is a first melody of the stored contents, to the address terminals of the audio memory 15 according to a clock signal CK applied from the frequency divider 14 and a control signal corresponding to the melody 1 applied through a start address assignment terminal from the controller 11.

On the other hand, a constant frequency signal generated by a crystal oscillator C and two inverters INV1 and INV2 is applied to the audio memory 15 as the clock signal CK. Thus, the digital audio signal corresponding to the melody 1 memorized in the audio memory 15 is provided through the output terminal OUT. The output digital audio signal is converted to the analog output signal by the D/A converter 102 and thereafter is amplified by the amplifier 103 so that the user can hear the melody represented by the audio signal.

Further, if the user presses the stop key SP of the key matrix 10 during the reproducing of the melody 1 memorized in the audio memory 15, the controller 11 stops the operation of the address generator 12, so that the signal being reproduced is not provided. Therefore, the current reproducing signal of melody 1 is stopped immediately. But, if the user again presses the playback key PB to hear the music, the playback is continued.

On the other hand, when a digital melody signal indicating the end of the melody 1 appears at the output terminal OUT of the audio memory 15 after completing the playback of the melody 1; that is; no signal lapse between melody 1 and melody 2 appears, the data signal indicating the end of the melody 1 is applied to a detection terminal E of the controller 11. Then, the controller 11 provides a control output signal for the start address of the melody 2, the second melody, to the address generator 12 through the start address assignment terminal. Accordingly, the address generator 12 provides the address signals A1-A10 for reproducing the melody 2 to the audio memory 15.

By repeating such a process, when all ten melodies are played back, the controller 11 stops the operation of the address generator 12 and the frequency divider 14, or plays back the melodies again from the first melody by generating the address signals A1-A10.

Further, in case of increasing the normal playback speed, when the user presses the high speed search key HS, the controller 11 in the playback system provides the speed control data D0-D3 to the frequency divider 14 in the speed control stage. At this time, the dividing ratio of the frequency divider 14 becomes less than 1 and a high level signal, logic 1, is applied to the up/down terminal of the address generator 12 so that the addressing speed is increased. The reference addressing speed is determined by the crystal oscillator C and the inverters INV 1 and INV 2 of the frequency oscillation circuit 13 in the speed control stage. Thus, if the high speed search key HS is pressed one time, then the dividing ratio of the frequency divider 14 becomes ½, thereby increasing the addressing speed by a factor of 2 with respect to reference addressing speed, and similarly if the high speed search key HS is pressed two times, the dividing ratio of the frequency divider 14 becomes ¼, thereby increasing the addressing speed by a factor of 4, if three times, it is increased by a factor of 8, and so forth .... This function may be obtained by a program already set in the controller 11.

Second, an automatic melody selection for reproducing the memorized digital melody after memorizing only desired melody data in the audio memory is to be described.

If the user presses an automatic melody selection key A and a melody number key, one of 0-9, in the middle of carrying out the normal playback of the melody 1, an automatic melody selection signal is applied to the controller 11 and then the controller 11 applies a high level signal to the up/down terminal UP/DOWN of the address generator 12. At the same time, the controller 11 controls the frequency divider 14 in the speed control means so that the dividing ratio becomes 1 to set the addressing speed to the reference speed.

Further, a start address of current assigned melody is applied to the address generator 12 through the start address assignment terminal of the controller 11 so that it is provided at the memory 100 of the audio memory disk 15. Therefore, the assigned melody in the memory 100 is provided to the output circuit 16 as the serial data through the shift register 101. The data applied to the output circuit 16 is converted to the analog signal by the D/A converter 102 and the analog signal is next amplified by the amplifier 103.

Further, the melodies memorized in the audio memory disk 15 are arbitrarily selected according to user's selection. That is, if the user wants to hear the melody in sequence of 1, 5, 3, 8, the user first presses the memory key M and next presses the melody selection keys in sequence of 1, 5, 3, 8. At this time, the controller 11 memorizes the control signal for the operation sequence of these function keys. Under the above state, if the user presses the playback key PB, the melody 1, the first melody, is introduced with the normal speed as mentioned above, and the user can adjust the playback speed.

After completing the playback of the melody 1, that is, when the end signal of the melody 1 is provided from the output terminal OUT of the audio memory 15, the start address of the next melody, the melody 5, is provided to the address generator 12 through the starting address assignment terminal of the controller 11. At this time, the start address of the melody 5 provided from the address generator 12 is applied to the memory 100 of the audio memory 15 so that the memorized data for the melody 5 is provided as the serial data through the shift register 101 from the audio memory 15. Next, the output digital melody signal provided from the audio memory 15 is converted to the analog signal by the D/A converter 102 and the analog signal is next amplified by the amplifier 103 connected to the output terminal of the D/A converter 102.

Similarly, after completing the playback of the melody 5, the end signal of the melody 5 is provided from the audio memory 15 and it is applied to the controller 11. Thereafter, the next melody 3 is reproduced as mentioned above. Accordingly, the automatic selection of the memorized melodies is possible according to user's selection. On the other hand, the playback speed is controlled by the frequency divider 14 of the frequency oscillation circuit 13 in the speed control means. With a fine adjustment of the dividing ratio, such as 0.9, 1.1 and so on, the output melody signal may have various qualities.

Next, the display circuit 17 for informing the state of the audio memory disk playback system to the user is now described.

The display circuit 17 turns on a light emitting diode corresponding to the playback key PB and displays the characters "PLAY" on a liquid crystal display when the playback key PB is pressed. On the other hand, the user presses the radio key R when the user wants to hear the radio broadcasting. The controller 11 recognizes this and stops the operation of the audio memory 15. In addition, the controller 11 provides the radio control signal to drive the radio circuit (not shown) so that the user can hear the radio broadcasting signal.

As mentioned above, the present invention can playback the digital melody stored in the audio memory 15 by recognizing the applied signal from the key matrix 10 through the controller 11 and generating the address. Further, the present invention can control the playback speed of the audio signal by increasing or decreasing the addressing speed as much as a multiple determined according to the control signal of the controller 11 after generating the reference frequency from the frequency oscillation circuit 13. Further, the present invention can carry out the automatic selection function after selecting the data stored in the audio memory 15 and storing it in the memory 100. At this time, the audio memory playback system can simply carry out the playback of the stored data by using the D/A converter 102 and the amplifier 103 and provide various qualities of sound by the dividing ratios of the playback speeds.

As mentioned above, the present invention does not need a complex circuit and mechanism, compared to the sound systems using the compact disks or the digital audio tapes, so that the total configuration of the present invention is very simple and it can be achieved by low cost especially as the price of the integrated circuits may be lowered in the future.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. An audio memory playback system, comprising:
    playback means comprising:
        controller means for controlling generation of different addresses and a playback speed according to an input control signal of a key matrix,
        address generator means connected to said controller means for generating each different addresses according to an output control signal of said controller means, and
        an audio memory connected to said address generator means, for storing digital representations of melodies at a plurality of locations addressable according to the addresses generated by said address generator means to read the digital representations stored in the audio memory;
    playback speed control means for increasing or decreasing speed of generation of said addresses by said address generator means by determining a dividing ratio under the control of said playback means;
    a display circuit for displaying visual indications of operational states of said key matrix; and
    an output circuit connected to an output terminal of the audio memory for converting the digital representations stored in the audio memory into audio melodies.

2. An audio memory playback system according to claim 1, wherein said speed control means comprises:
    frequency oscillation circuit means for generating a reference frequency signal by using a crystal oscillator, and
    frequency divider means for dividing the reference frequency from said frequency oscillation circuit means in response to control signals transmitted from said key matrix.

3. An audio playback system according to claim 2, wherein said output circuit comprises:
    means for converting said digital representations provided from the audio memory to analog signals, and
    means coupled for receiving and amplifying said analog signals.

4. An audio memory playback system according to claim 1, wherein said output circuit comprises:

a digital-to-analog converter for converting said digital representations provided from the audio memory into analog signals, and an amplifier connected to an output terminal of said digital-to-analog converter for amplifying the analog signals output by said digital-to-analog converter to provide said audio melodies.

5. An audio memory playback system according to claim 1, wherein said display circuit comprises light emitting diodes or liquid crystal displays to display visually the operational states of said key matrix.

6. An audio disk playback system, comprising:

control means connectable to a data input terminal, for generating first control signals controlling generation of addresses and playback speeds in response to reception of data at said data input terminal;

frequency generating means, for responding to said first control signals by generating second control signals exhibiting a frequency depending upon said first control signals;

address generating means for generating the addresses in response to said first and second control signals;

audio memory disk means connectable to be addressed by said address generating means, for responding to said first and second control signals by reading digital representations of stored data in response to said addresses; and output means for transmitting audio signals in dependence upon reception of said digital representations.

7. The audio disk playback system of claim 6, further comprised of said address generating means providing said addresses at a rate determined by said second control signals.

8. The audio disk playback system of claim 7, further comprised of said audio memory disk means storing an end signal for each of said addresses, and applying said end signal to said control means upon completion of said reading of said digital representations for a previously received address corresponding to said digital representations.

9. The audio disk playback system of claim 8, further comprised of said control means responding to reception of said end signals by generating said first control signals.

10. The audio disk playback system of claim 6, further comprised of said audio memory disk means storing an end signal for each of said addresses, and applying said end signal to said control means upon completion of said reading of said digital representations for a previously received address corresponding to said digital representations.

11. The audio disk playback system of claim 10, further comprised of said control means responding to reception of said end signals by generating said first control signals.

* * * * *

UNITED STATES PATENT AND TRADEMARK OFFICE
CERTIFICATE OF CORRECTION

PATENT NO. : 5,173,888
DATED : 22 December, 1992
INVENTOR(S) : Il-Sung An

It is certified that error appears in the above-indentified patent and that said Letters Patent is hereby corrected as shown below:

Column 1    Line 26, before "trouble" change "causes" to --causing--;

Line 65, before "playback" delete "disk";

Column 2    Line 41, after "11" insert comma --,--;

Line 54, after "playback" change "systems" to --system--;

Line 59, before "divider" delete "signal";

Column 4    Line 6, before "melody" insert --the--;

Column 8    Line 8, after "claim" change "7" to --6--;

Line 19, after "claim" change "6" to --7--:

Signed and Sealed this

Sixth Day of May, 1997

*Attest:*

BRUCE LEHMAN

*Attesting Officer*    Commissioner of Patents and Trademarks